(12) United States Patent
Lee et al.

(10) Patent No.: US 7,936,287 B1
(45) Date of Patent: May 3, 2011

(54) INTERACTIVE WEB-BASED CODESET SELECTION AND DEVELOPMENT TOOL

(75) Inventors: Jonathan Lee, Santa Clara, CA (US); Oscar C Miramontes, El Paso, TX (US)

(73) Assignee: UEI Cayman Inc., Cypress, CA (US)

( * ) Notice: Subject to any disclaimer, the term of this patent is extended or adjusted under 35 U.S.C. 154(b) by 930 days.

(21) Appl. No.: 11/893,421

(22) Filed: Aug. 15, 2007

Related U.S. Application Data

(63) Continuation of application No. 10/777,023, filed on Feb. 10, 2004, now Pat. No. 7,259,696.

(51) Int. Cl.
*H04L 17/02* (2006.01)

(52) U.S. Cl. .......................................... 341/23; 341/176

(58) Field of Classification Search ............... 341/23, 341/173, 175, 176; 340/825.22, 825.24, 340/825.25, 825.69, 825.72; 348/734; 398/106, 398/111, 112; 700/65, 83, 84; 709/219, 709/221; 715/749, 760, 864; 717/171
See application file for complete search history.

(56) References Cited

U.S. PATENT DOCUMENTS

| | | | | |
|---|---|---|---|---|
| 4,623,887 A | 11/1986 | Welles, II | .................. | 340/825.57 |
| 4,703,359 A | 10/1987 | Rumbolt et al. | ........... | 358/194.1 |
| 5,081,534 A | 1/1992 | Geiger et al. | .................. | 348/734 |
| 5,228,077 A | 7/1993 | Darbee | .......................... | 379/102 |
| 5,386,251 A | 1/1995 | Movshovich | .................. | 348/734 |
| 5,629,868 A | 5/1997 | Tessier et al. | .................. | 364/514 |
| 6,040,829 A | 3/2000 | Croy et al. | ..................... | 715/864 |
| 6,104,334 A | 8/2000 | Allport | ......................... | 341/175 |
| 6,408,435 B1 | 6/2002 | Sato | ................................. | 725/58 |
| 6,640,144 B1 | 10/2003 | Huang et al. | .................... | 700/65 |
| 6,650,248 B1 | 11/2003 | O'Donnell et al. | ...... | 340/825.69 |
| 6,774,813 B2 | 8/2004 | van Ee et al. | ........... | 340/825.69 |
| 6,785,579 B2 | 8/2004 | Huang et al. | .................... | 700/65 |
| 6,844,900 B2 | 1/2005 | Yuen | ............................. | 348/734 |
| 7,093,003 B2 * | 8/2006 | Yuh et al. | ....................... | 709/219 |
| 2001/0033243 A1 | 10/2001 | Harris et al. | .................. | 341/176 |
| 2002/0158772 A1 | 10/2002 | Mears | ....................... | 340/825.22 |
| 2003/0151538 A1 * | 8/2003 | Escobosa et al. | ............. | 341/176 |
| 2004/0119894 A1 | 6/2004 | Higgins et al. | ................ | 348/734 |

* cited by examiner

*Primary Examiner* — Edwin C Holloway, III
(74) *Attorney, Agent, or Firm* — Greenberg & Traurig, LLP

(57) ABSTRACT

An interactive, web-based codeset selection and development tool transmits hypertext documents from a web server to a web browser of a developer of microcontroller code for a new remote control device. The hypertext documents include selection criteria for groups of codesets stored in a central database of codesets. The developer selects the most appropriate codesets for the new remote control device using the selection criteria. The selection and development tool converts each of the selected codesets into a plurality of strings of timing information. The strings are encrypted and transmitted to the developer along with a signal engine. The developer loads the encrypted strings and the signal engine into a new microcontroller that has a factory-programmed decryption key. The microcontroller decrypts the encrypted strings of timing information and uses them and the signal engine to generate operational signals that control various functions of electronic consumer devices.

6 Claims, 13 Drawing Sheets

INTERACTIVE WEB-BASED CODESET SELECTION AND DEVELOPMENT TOOL

CROSS REFERENCE TO RELATED APPLICATION

This application is a continuation of, and claims priority under 35 U.S.C. §120 from, nonprovisional U.S. patent application Ser. No. 10/777,023 entitled "Interactive Web-Based Codeset Selection and Development Tool," filed on Feb. 10, 2004, now U.S. Pat. No. 7,259,696 the subject matter of which is incorporated herein by reference.

TECHNICAL FIELD

The present invention relates generally to remote control devices and, more specifically, to protecting codeset data used by remote control devices to operate electronic consumer devices.

BACKGROUND

Manufacturers of electronic consumer devices, such as televisions, radio tuners, digital video disk players, video cassette recorders, set-top cable television boxes, set-top satellite boxes, etc., typically supply a remote control along with each electronic consumer device. The remote control can control the associated electronic consumer device by sending an operational signal with a key code to the electronic consumer device. Each such key code corresponds to a function of the selected electronic consumer device, such as power on, volume down, play, stop, select, channel advance, channel back, etc. Thus, a electronic device is controlled by a codeset of key codes.

Codesets can differ from each other not only by the bit patterns assigned to the key codes, but also by the timing, modulation and framing protocols used to modulate the bit patterns onto operational signals. In order to avoid the situation where a signal containing a key code operates an electronic device that is not selected, manufacturers of electronic consumer devices may use different codesets for different devices. Although each model of electronic device might not have a unique codeset, there are nevertheless thousands of codesets used to operate the various types, brands and models of electronic consumer devices sold in the world market today.

Microcontrollers in remote controls are typically supplied to remote control manufacturers preloaded with codesets that operate the various types, brands and models of electronic devices that the remote control is to operate. It is therefore of significant value to a microcontroller manufacturer to be able to supply the appropriate codesets needed for each possible remote control application. A microcontroller manufacturer that has the codesets needed for a particular remote control application has a competitive advantage over another microcontroller manufacturer that does not have the needed codeset. Microcontroller manufacturers therefore devote great effort and expense amassing a large and comprehensive databases of codesets. These codeset databases are valuable to the microcontroller manufacturers. Microcontroller manufacturers therefore attempt to keep their codeset databases proprietary.

Not only does knowledge of codesets constitute a competitive advantage to a microcontroller manufacturer, but knowledge of codesets is also of value to remote control manufacturers and providers of codeset database services. An unscrupulous remote control manufacturer has an incentive to purchase microcontrollers cheaply without preloaded codesets, and then to load copied codesets that were assembled and compiled by a microcontroller manufacturer. In this way the remote control manufacturer can avoid paying for the collection costs borne by the microcontroller manufacturer. In a similar fashion, a provider of codeset database services also has an incentive to provide services using copied codesets that were assembled and compiled by a microcontroller manufacturer.

A microcontroller manufacturer may wish to allow its microcontrollers to be loaded with a codeset after the remote control containing the microcontroller has been shipped. This can involve transmitting a newly available codeset over a telephone cable or a cable TV line to a consumer. Using various programming aids, the consumer receives the transmitted codeset and loads it into the remote control microcontroller. Although the codesets that a consumer loads onto a commercially available universal remote control can be vulnerable to copying, it is relatively time consuming and costly to copy a large number of codesets, for example, thousands, using the programming aids typically made available to consumers.

A microcontroller manufacturer may also wish to allow remote control developers to have access to a large number of codesets so that the remote control developers can develop new models of remote controls that contain the manufacturer's microcontroller. Currently a developer who wants to develop microcontroller software for a new model of remote control first writes a "software functional specification" that describes the desired functionality of the new remote control. The software functional specification is a document that is sent to the microcontroller manufacturer. The microcontroller manufacturer uses the software functional specification to select the required codesets from the manufacturer's database of codesets. The manufacturer then writes microcontroller software that performs the functions specified in the software functional specification. The resulting software is then sent to the developer, who tests the software in the developer's test system. If the developer finds a deficiency in the software, then the microcontroller manufacturer typically debugs the software until the developer is satisfied. This is a time consuming process. Microcontroller manufacturers typically want to limit the amount of their own resources devoted to developing software for remote control developers, especially developers who purchase only low volumes of microcontrollers.

Microcontroller manufacturers could reduce the amount of their resources devoted to developing software for remote control developers by providing the developers access to the manufacturer's database of codesets. Providing such access to developers, however, might provide an opportunity for an unscrupulous seller of remote controls or an unscrupulous provider of codeset database services to copy a large number of codesets with minimum effort.

A solution is therefore desired that allows remote control developers to download codesets from a database of codesets and to use the downloaded codesets for authorized purposes, but that at the same time prevents an unscrupulous remote control seller or codeset database service provider from copying a large number of codesets from the database of codesets.

SUMMARY

An interactive, web-based codeset selection and development tool allows a remote control developer to use information in a central database of codesets to develop microcontroller code for a new remote control device without allowing the developer to copy codesets in the format they are stored in the central database. The selection and development tool transmits hypertext documents from a web server to a computer (for example, a personal computer or workstation) of the developer. The hypertext documents include selection criteria for groups of codesets stored in the central database. The developer uses a web browser to choose certain selection criteria. An indication of the chosen selection criteria is sent from the developer's computer back to the web server. The web server uses the chosen selection criteria to select the most appropriate codesets for the new remote control device.

The selection and development tool converts each of the selected codesets into a plurality of strings of timing information. The strings are encrypted in the web server and are transmitted to the developer's computer along with a signal engine and a compiler for the signal engine. The developer may view and customize parts of the signal engine on his computer. The developer then compiles the signal engine and loads the compiled signal engine into a new microcontroller that is housed on a microcontroller development board. The developer also loads the encrypted strings into the new microcontroller, which has a preloaded decryption key. The encrypted strings of timing information are decrypted in the microcontroller using the preloaded decryption key. The compiled signal engine then uses the decrypted strings of timing information to generate operational signals that control various functions of electronic consumer devices.

In one embodiment, the selection and development tool enables the developer to fill the available memory of the new microcontroller with codeset information from: a unique group of codesets that controls the largest number of device brands, a unique group of codesets that controls the largest number of device models, a unique group of codesets that controls the most popular device brands, or a unique group of codesets that controls the most popular device models.

In yet another embodiment, the selection and development tool generates a script instead of strings of timing information. The script contains embedded codeset information. The script is encrypted, sent to the microcontroller development board, and then loaded into a new microcontroller for a remote control device. In addition to the script, a script interpreter program and the signal engine are loaded into the microcontroller. The script is decrypted in the microcontroller. When a key on the remote control device is pressed, the script interpreter program interprets the script, thereby generating a string of timing information. The signal engine uses the string of timing information to generate an operational signal. The operational signal may, for example, be the envelope of an infrared signal. The operational signal is transmitted on an IR carrier signal from the remote control device and to an electronic consumer device such that the electronic consumer device is controlled to perform a desired function.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
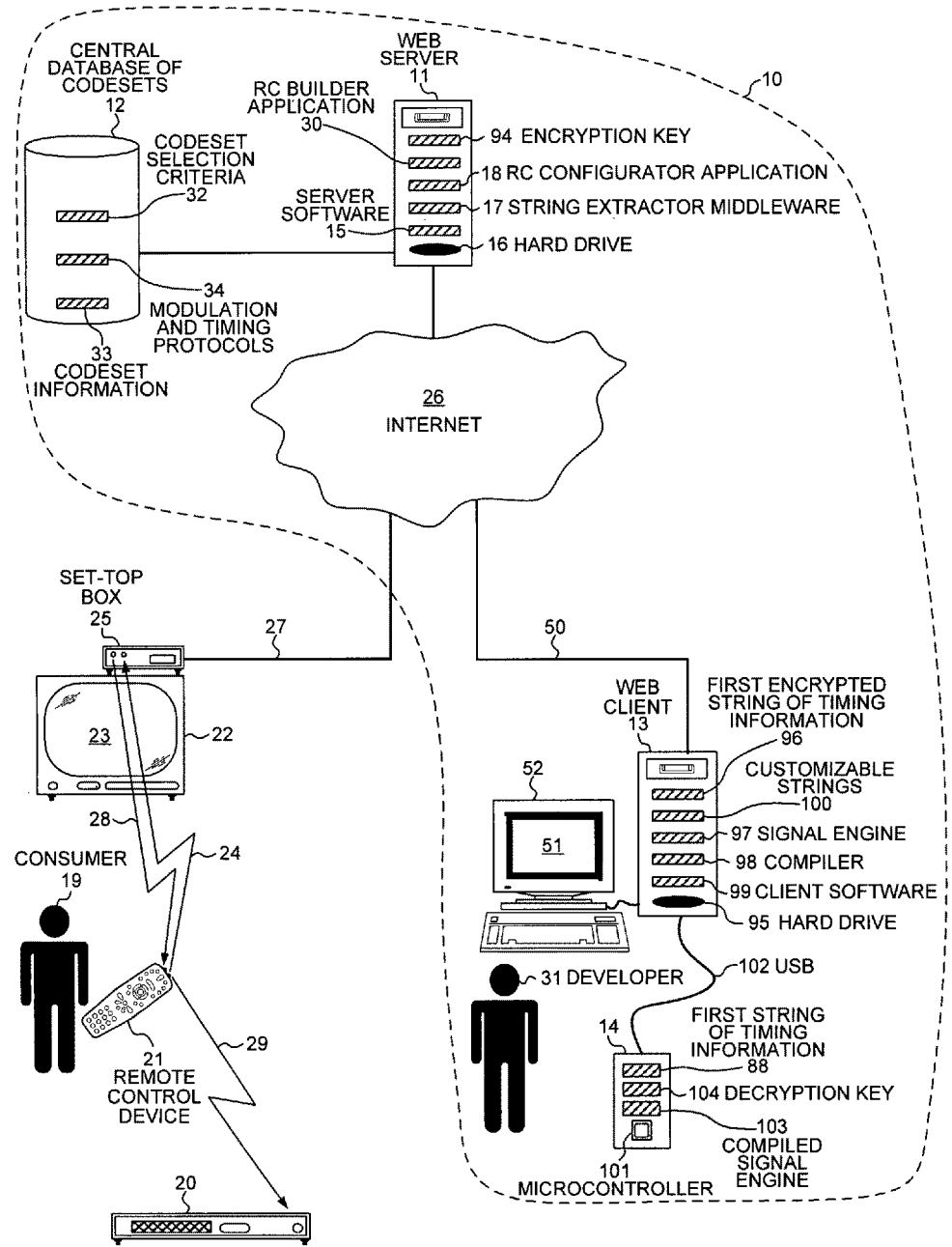
FIG. 1 is a schematic diagram of an interactive, web-based codeset selection and development tool in accordance with the present invention.

FIG. 1 is a diagram of an interactive, web-based codeset selection and development tool 10. Selection and development tool 10 includes a web server 11, a central database of codesets 12, a web client 13 and a microcontroller development board 14. Web server 11 is a multi-user platform implemented using server software 15. Server software may be stored on a hard drive 16. Server software 15 can, for example, employ a Microsoft server architecture. String extractor middleware 17 in turn operates on top of server software 15 and accesses data in central database 12. Central database of codesets 12 can be physically located on a device that is separate from web server 11, or database 12 can comprise database software running on web server 11.

Two applications are running on web server 11. One of the applications is a remote controller configurator for consumers called "RC Configurator" 18. RC Configurator application 18 allows a consumer 19 of an electronic consumer device 20 to program a remote control device 21 to control electronic consumer device 20. For example, remote control device 21 can be a universal remote controller purchased separately from electronic consumer device 20, which in this example is a digital video disc (DVD) player. Consumer 19 sits in front of television set 22 and uses programming instructions displayed on on-screen display 23 to load remote control device 21 with a codeset that controls DVD player 20. RC Configurator application 18 assists consumer 19 to identify the particular codeset that controls DVD player 20. Consumer 19 responds to queries on on-screen display 23 by sending a configuration signal 24 from remote control device 21 to a set-top box 25. The images for on-screen display 23 are generated in set-top box 25. RC Configurator application 18 then retrieves the applicable codeset from central database 12 and sends the codeset via Internet 26 and cable TV line 27 to set-top box 25. The codeset is then sent to remote control device 21 in programming signal 28. Remote control device 21 can then, for example, turn on DVD player 20 by sending a "power on" key code in an operational signal 29 to DVD player 20. For additional details on RC Configurator application 18, see U.S. patent application Ser. No. 10/428,351 entitled "Using a TV Screen to Program a Remote Control Device to Operate an Electronic Consumer Device," filed on May 2, 2003, which is herein incorporated by reference.

The second application running on web server 11 is called "RC Builder" 30. RC Builder application 30 is targeted at the engineering community as opposed to consumers of electronic consumer devices and end-users of remote control devices. RC Builder application 30 is the software application of interactive, web-based codeset selection and development tool 10 that allows engineers to develop software code for microcontrollers in new remote control devices with minimal interaction with personnel from the microcontroller manufacturer.

RC Builder application 30 is a web-enabled application that runs on top of server software 15. RC builder uses string extractor middleware 17 to access the database of codesets 12. Because RC Builder application 30 is web-based, a developer 31 designing a new remote control device can log onto a website and access central database 12 from the developer's own laboratory or office. Developer 31 does not need to come to the facilities of the microcontroller manufacturer to access central database 12 for authorized purposes. Interactive, web-based codeset selection and development tool 10 permits the microcontroller manufacturer to provide controlled access to data in its central database 12, such as codeset selection criteria 32, codeset information 33, and tables of modulation, timing and framing protocols 34.

Figure 2:
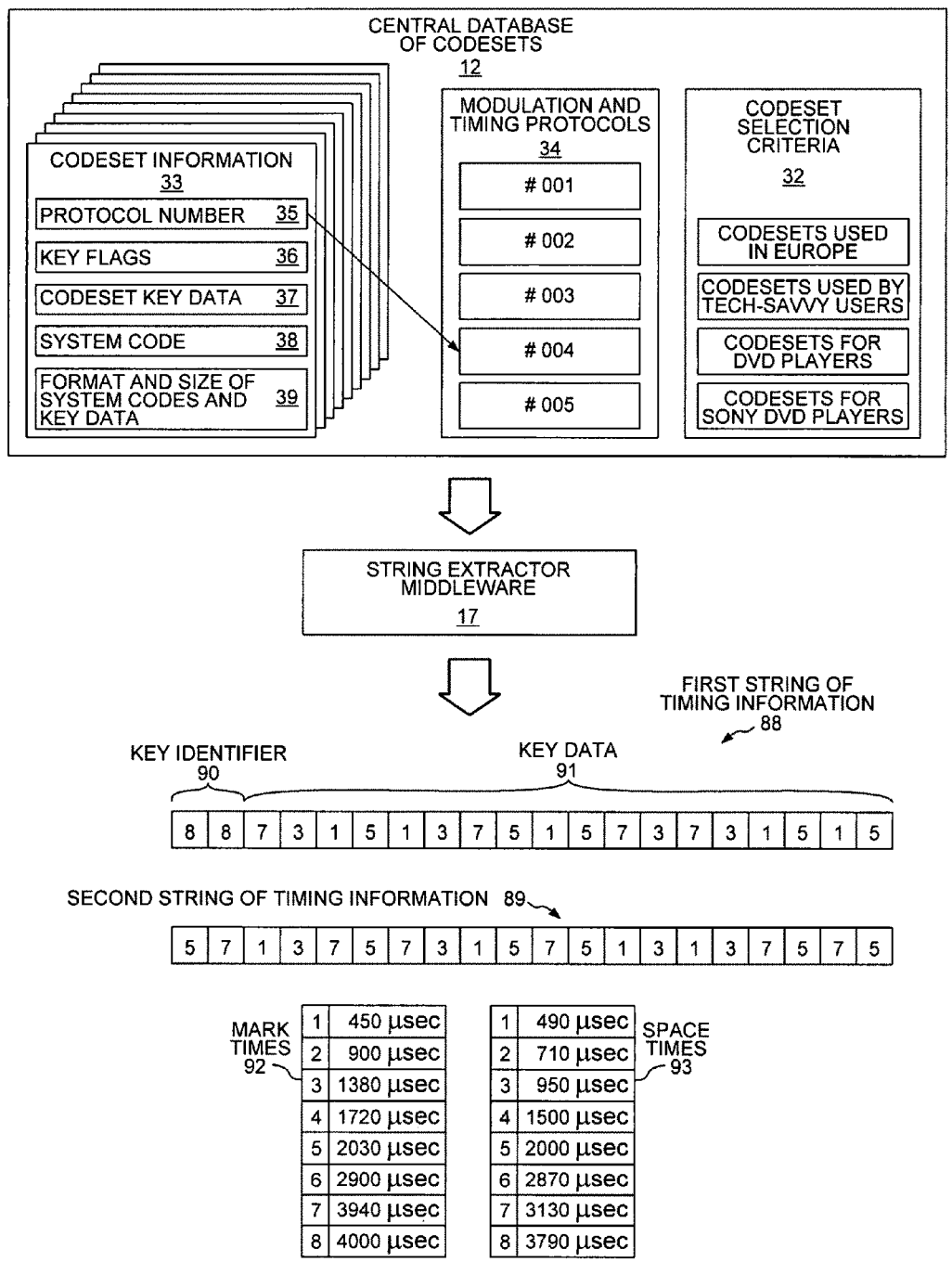
FIG. 2 is a diagram showing the contents and format of data within a central database of FIG. 1 in more detail.

FIG. 2 shows the content and format of data within central database 12 in more detail. Codeset selection criteria 32 includes information on which codesets are the most popular and most commonly used in various geographical regions and among predefined demographic groups of people. For example, one group of codesets is most commonly used in Europe. Another group of codesets is most frequently used by tech-savvy users and early adopters of new electronic consumer devices. Codeset selection criteria 32 also lists most or all of the codesets that control a particular type of electronic consumer device. For example, codeset selection criteria 32 includes the group of codesets that controls DVD players. In addition, codeset selection criteria 32 lists most or all of the codesets that control a particular brand of electronic consumer device. For example, codeset selection criteria 32 includes the group of codesets that controls DVD players manufactured by Sony Corporation.

FIG. 2 shows some components of codeset information 33 for one particular codeset that controls a particular electronic consumer device. Codeset information 33 includes a protocol number 35, key flags 36, codeset key data 37, a system code 38, and format and size information 39 relating to the system code and key data. Protocol number 35 is a pointer that points to one of the protocol tables, where the pointed-to protocol table contains the modulation, timing and framing protocol used to modulate key data 37 and system code 38 onto an operational signal that is understood by a particular electronic consumer device. The digital values of system code 38 and key data 37 are modulated onto operational signals using a modulation technique (for example, pulse width modulation) determined by the protocol table that is pointed to. For example, digital ones and zeros are characterized by pairs of marks and spaces. A "mark/space" pair represents a digital zero, and another "mark/space" pair represents a digital one. For each codeset, the marks and spaces for each digital pair have predefined lengths. The protocol number (35) in FIG. 2 links the particular illustrated codeset to protocol table #004.

Key flags 36 indicate the supported functions of the particular electronic consumer device (or devices) that are to be controlled by a specific key or keys of a remote control device. For example, such functions can include volume up, volume down, channel advance, channel back, cursor up, cursor down, cursor right, cursor left, select, play, record, stop, forward, back, pause, play VCR, play DVD, TV power on, and DVD and stereo equalizer power on. Generally, there is one flag bit for each supported function. In one example, a function can be a macrofunction that would typically result from the pressing of multiple keys (for example, the "play DVD" function). If the flag bit associated with the function is "0", then the function is not supported. If the flag bit associated with the function is "1", then the function is supported.

Codeset key data 37 are the binary codes associated with each function supported by a particular brand and model of electronic consumer device. System code 38 designates the type of electronic consumer device that the codeset controls. The same codeset key data 37 can control functions on different types of electronic consumer devices by being distinguished by the system code applicable to the applicable device type. For example, key data associated with the function "play DVD" can also be used for the function "play VCR" if the key data for "play" is distinguished by the system code for VCR or DVD. When a consumer presses the "VCR" key and then the "play" key, an operational signal is transmitted with a system code for VCR and key data for "play". An operational signal with the same key data for "play" controls the DVD player when the operational signal contains the system code for DVD. System codes allow manufacturers of different types of electronic consumer devices to use the same codeset key data for all of their products without causing consumers to inadvertently operating multiple device types with the same operational signal. Format and size information 39 indicates the length in bytes of key data 37 and system code 38, as well as the order in which they are transmitted.

Figure 3:
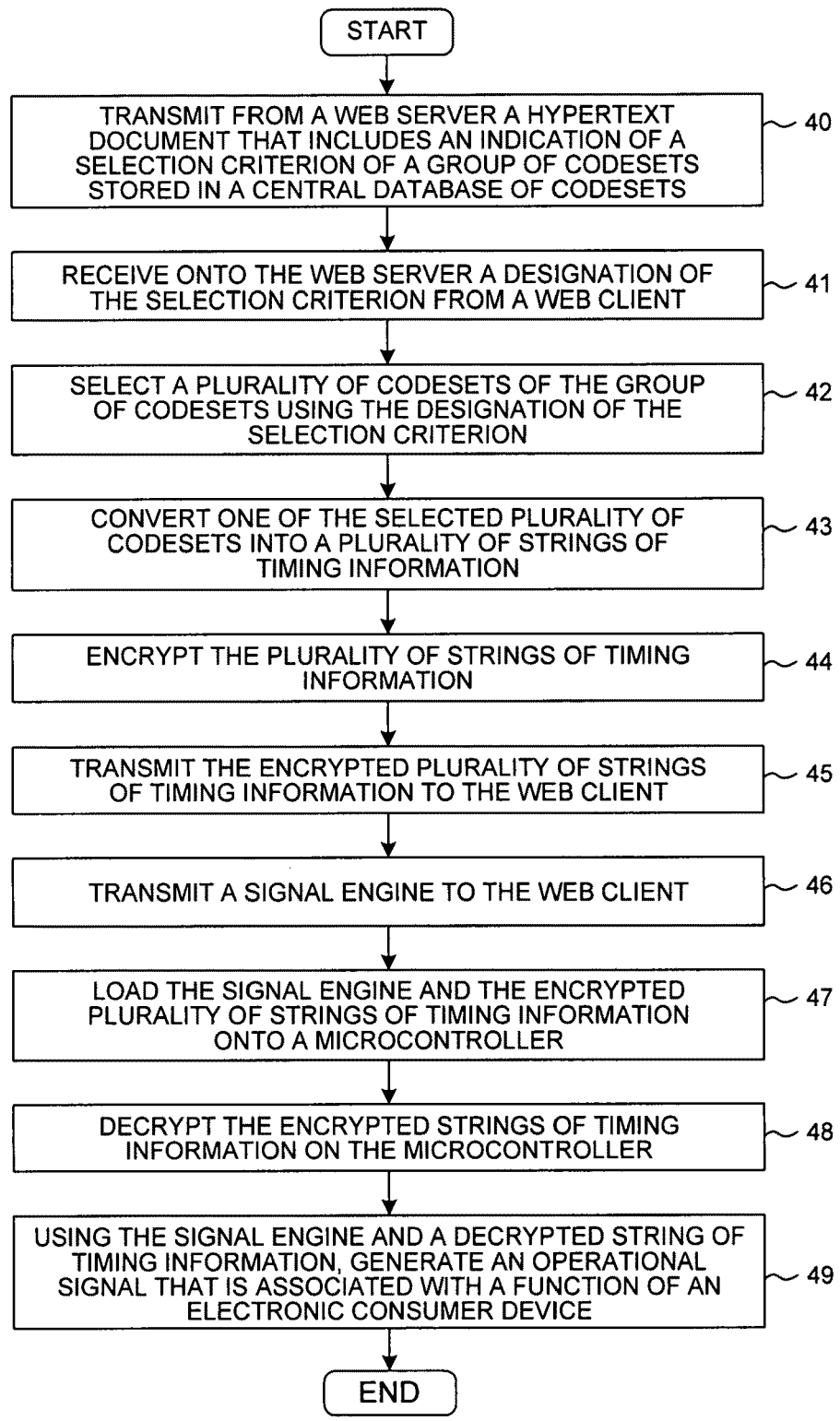
FIG. 3 is a flowchart of steps for selecting codesets, retrieving the codesets from the central database and using the codesets in a microcontroller of a remote control device to control electronic consumer devices.

FIG. 3 is a flowchart that illustrates a method of operation of interactive, web-based codeset selection and development tool 10. FIG. 3 shows steps 40-49 for selecting codesets, retrieving the codesets from central database 12 and using the codesets in a microcontroller of a remote control device to control electronic consumer devices. The steps of FIG. 3 will now be described using the example of developer 31 developing microcontroller code for a new model of remote control device. To develop microcontroller code for a new model of remote control device, developer 31 accesses selection and development tool 10 via Internet 26 and telephone cable 50. Access can be provided to selection and development tool 10 without establishing a secure connection over telephone cable 50. A web browser 51 on a personal computer 52 of developer 31 renders hypertext documents that are served up by web server 11. Personal computer 52 may, for example, be a conventional personal computer, a laptop computer or a workstation.

Figure 4:
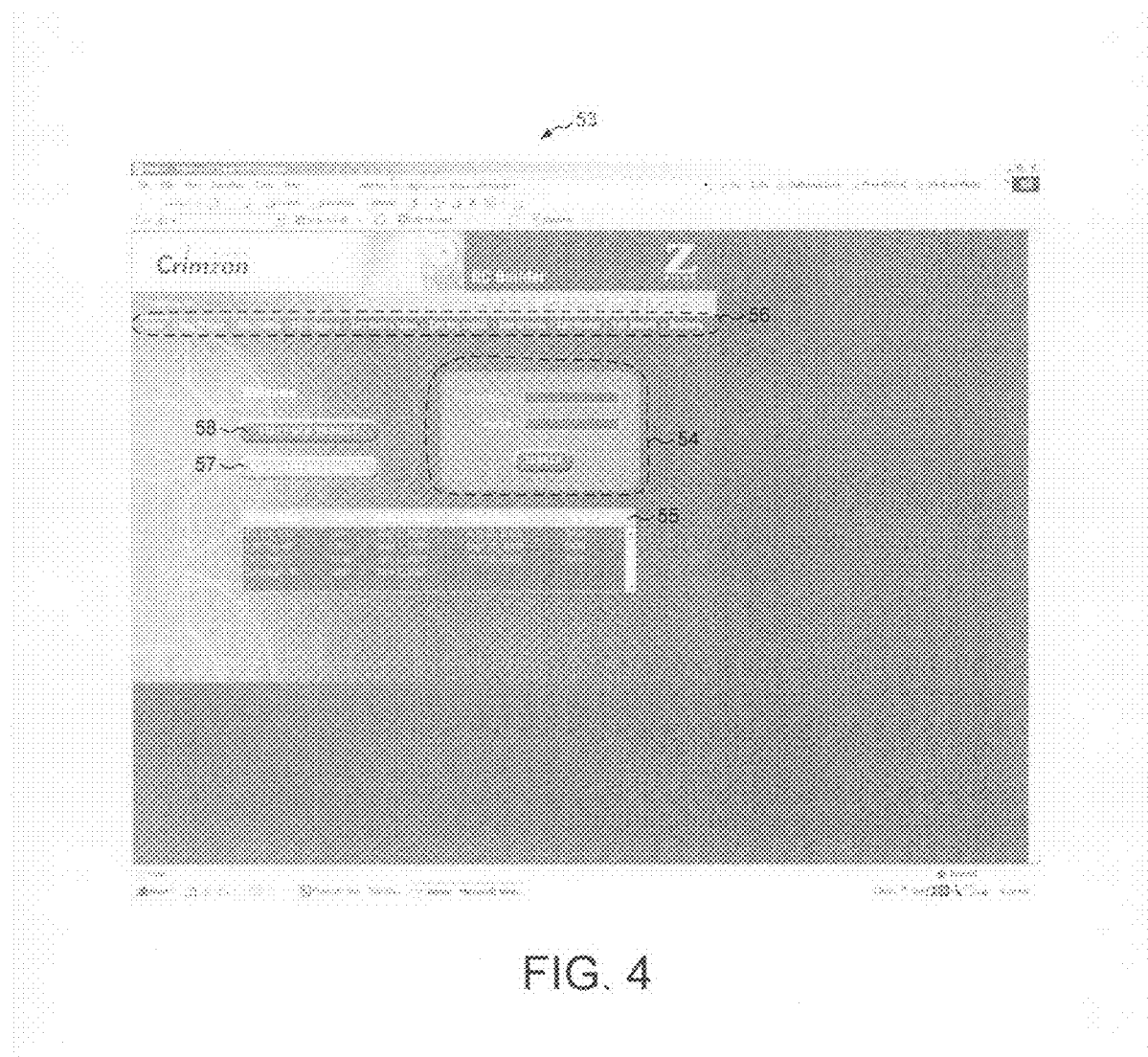
FIG. 4 is a screenshot of a web page that a developer first views to gain access to the selection and development tool of FIG. 1.

FIG. 4 shows a "home" screen 53 that developer 31 first views to gain access to selection and development tool 10. Home screen 53 is served up by web server 11 when developer 31 enters the website of the microcontroller manufacturer. Home screen 53 has a field 54 for developer 31 to enter a username (labeled "Project Name") and password (labeled "Ref ID"). By only allowing those to access the website who have provided an authorized password, unrestricted coping of information off the web site is prevented while allowing authorized users access to the web site from their remote locations.

A window 55 contains a list of projects for developing microcontroller code. Across the top of screen 53 is a navigation bar 56 with the following links: "home", "new project", "edit profile", "edit regions", "edit device types", "edit key layout", "edit criteria", "edit brands", "edit models" and "summary". These links represent the various steps involved in developing microcontroller code for a new remote control device. When developer 31 clicks on one of these links on navigation bar 56, a screen for that particular task appears. To continue an existing design project, developer 31 selects the existing project and then clicks on an "edit existing project" button 57. To start a new project, developer 31 clicks on a "start new project" button 58.

Figure 5:
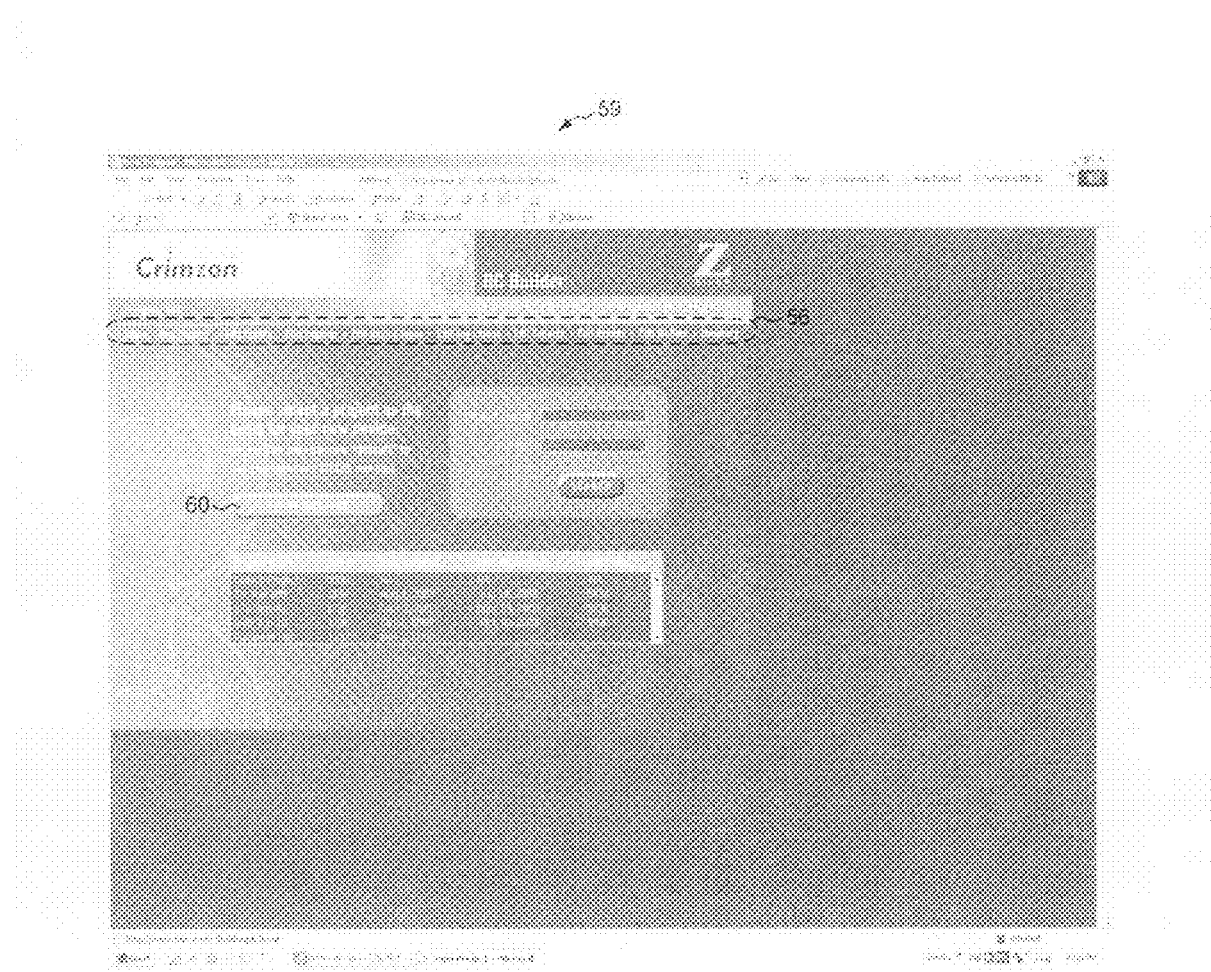
FIG. 5 is a screenshot of a web page that appears when a developer selects a "start new project" button in FIG. 4.

FIG. 5 shows a screen 59 that appears when developer 31 selects "start new project" button 58 on screen 53. To start a new project, developer 31 selects a project to use as a template and clicks on a "start project" button 60. This, causes the selected project to be cloned. Because developing microcontroller code from scratch is difficult, the procedure for starting a new project involves cloning a selected existing project and then modifying and customizing that project. The template project entitled "Default Project" is provided by the microcontroller manufacturer in the event that developer 31 is designing his very first project. The template project provides developer 31 sample entries to assist the developer in his selection of codesets.

Figure 6:
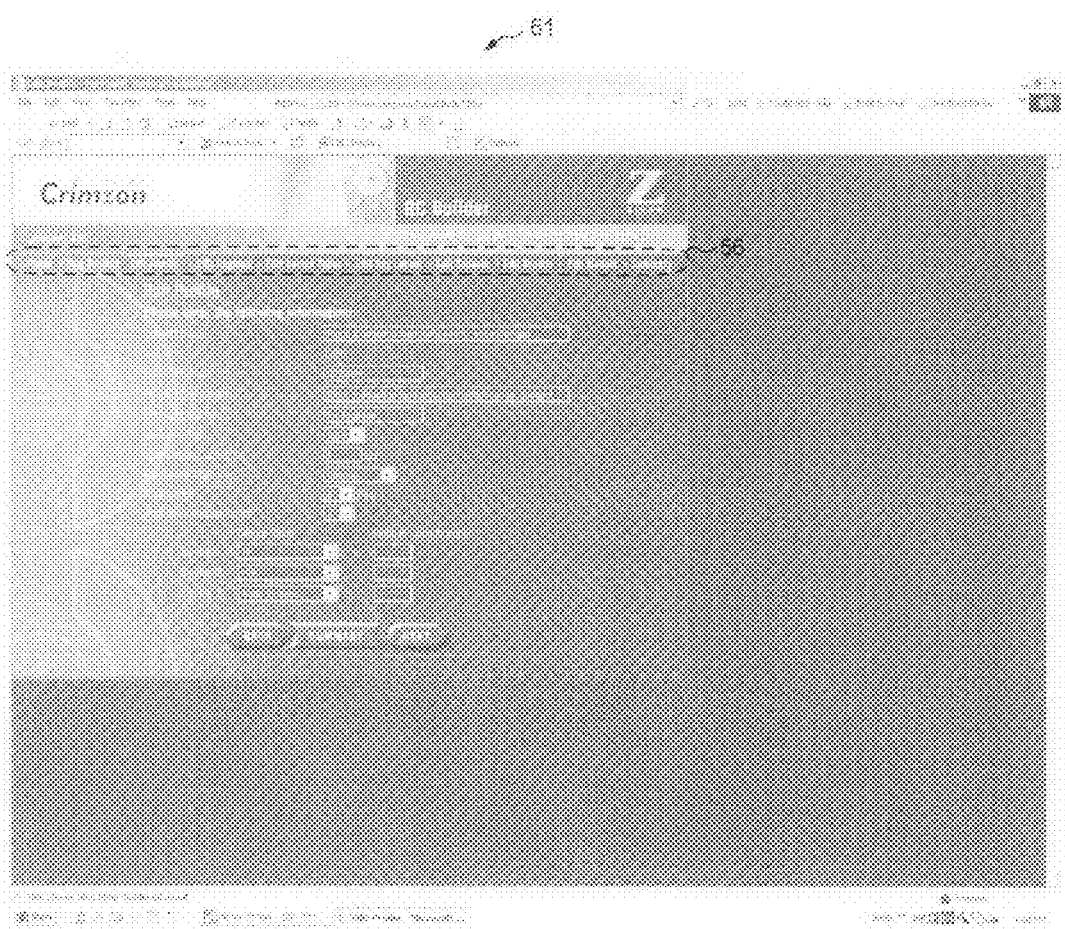
FIG. 6 is a screenshot of a web page that prompts the developer to enter information concerning microcontroller code for a new remote control device.

FIG. 6 shows a screen 61 that appears after developer 31 clicks the "start project" button 60 on screen 59. Navigation bar 56 indicates that screen 61 is the "edit profile" screen. Developer 31 is prompted to enter information about the microcontroller of the new remote control device. For example, the default microcontroller described by screen 61 has eight pins and a total memory of thirty-two kilobytes. The default microcontroller is to be used in a remote control device that has three dedicated device-type keys, i.e., for a TV, a VCR and an audio system.

Figure 7:
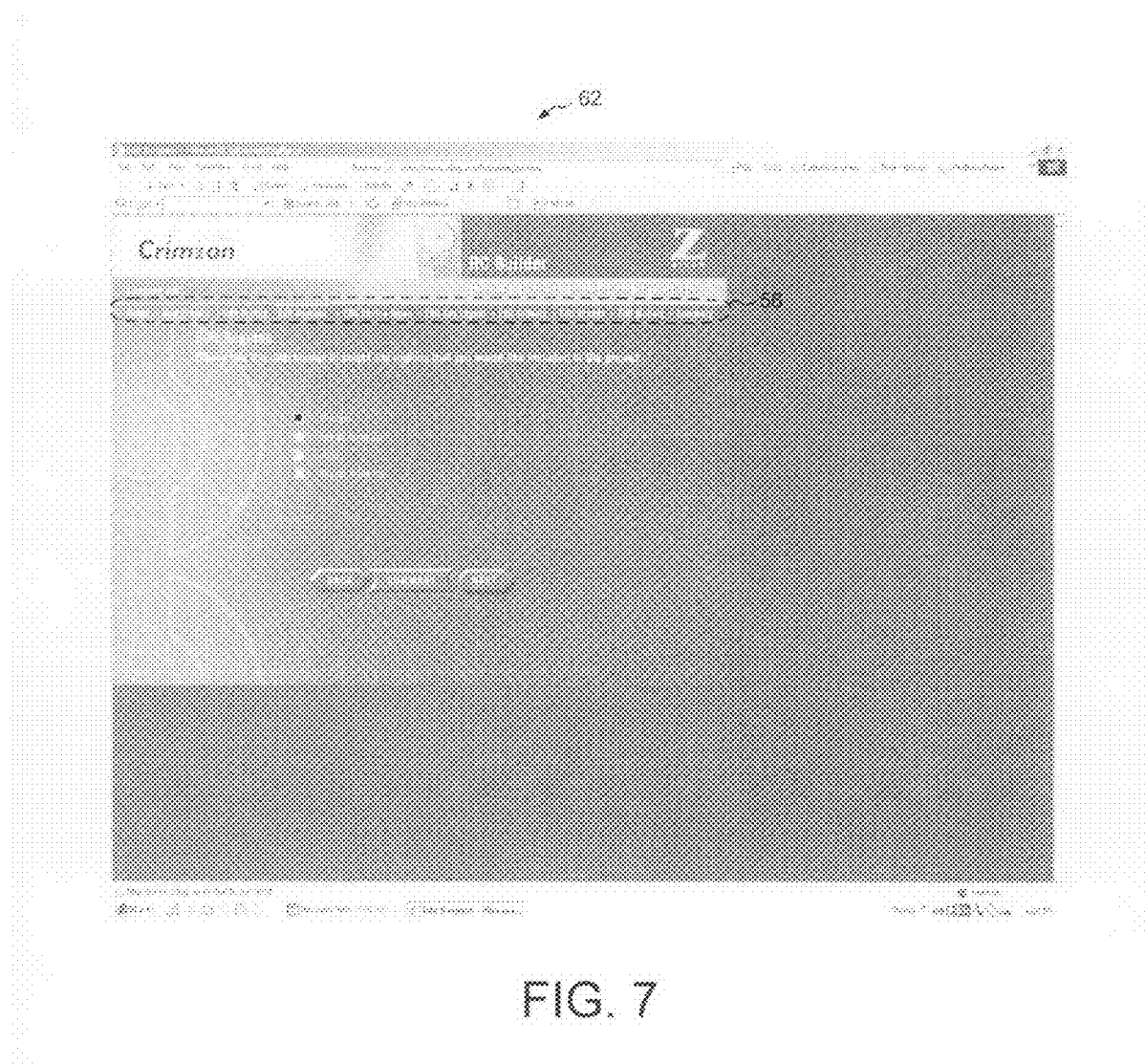
FIG. 7 is a screenshot of a web page that prompts the developer to select a region in which the new remote control device will be used.

FIG. 7 shows a screen 62 that appears when developer 31 clicks on the "next" button on screen 61 once all the information concerning the microcontroller of the new remote control device has been entered. Navigation bar 56 indicates that screen 62 is the "edit regions" screen. In this step of the development process, selection and development tool 10 allows developer 31 to select a group of codesets for the microcontroller code based on a selection criterion. Screen 62 corresponds to a hypertext document served up by web server 11 that includes an indication of a selection criterion of a group of codesets stored in central database of codesets 12. The selection criterion presented on screen 62 is the geographical region where certain groups of codesets are most commonly used, for example, Europe, North America, Asia and South America. In this example, developer 31 has selected Europe.

Figure 8:
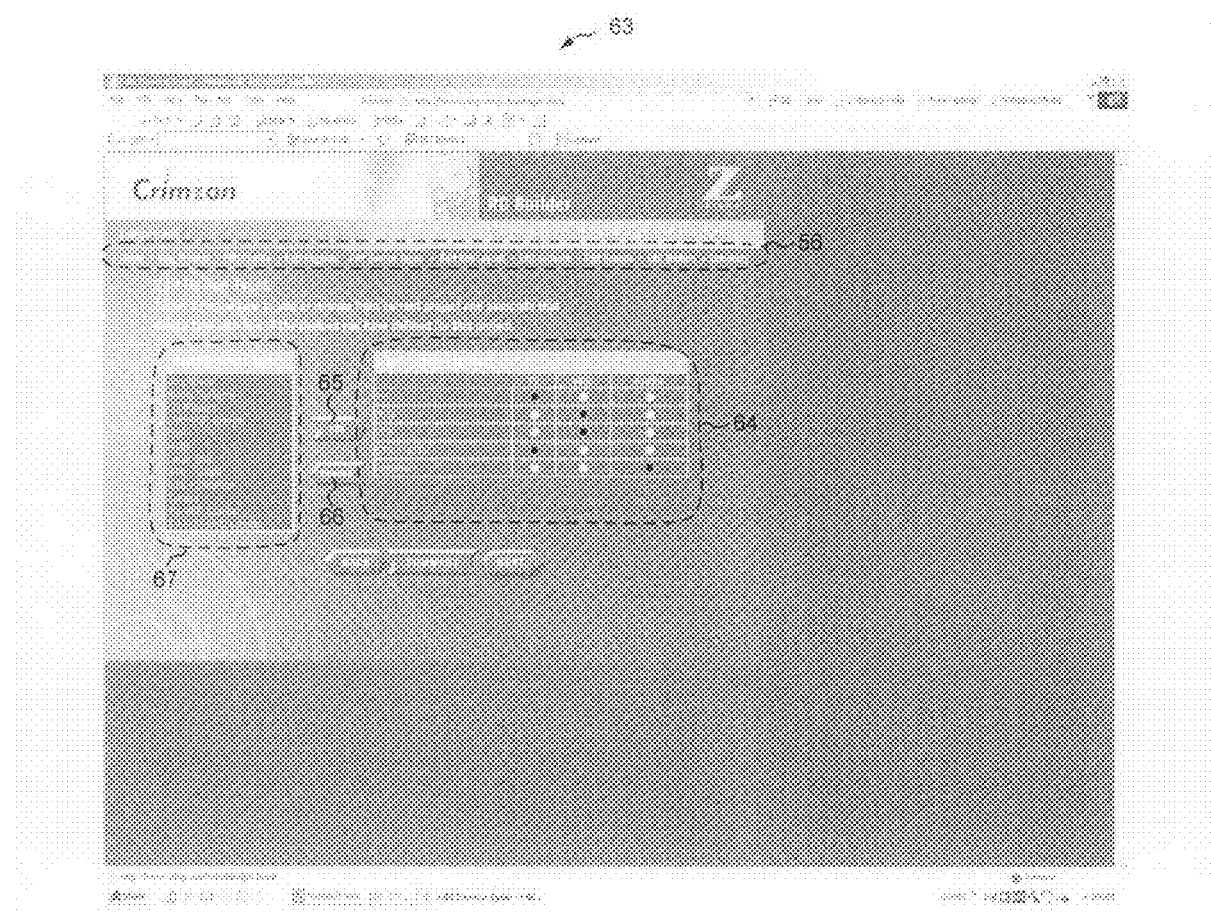
FIG. 8 is a screenshot of a web page that prompts the developer to select the device types that the new remote control device is to control.

FIG. 8 shows a screen 63 that is served up by web server 11 when developer 31 clicks on the "next" button on screen 62 once all the desired regions are selected in which the new remote control device is to operate. Navigation bar 56 indicates that screen 63 is the "edit device types" screen. Screen 63 provides developer 31 with an indication of an additional selection criterion for a group of codesets stored in central database of codesets 12. The selection criterion presented on screen 63 is the types of electronic consumer devices that the new remote control device is to control. On screen 63, certain selections are already made in accordance with the project selected. For example, three columns are present in a "device types in project" table 64 that correspond to the three dedicated device-type keys (TV, VCR and Audio) entered on screen 61. Developer 31 then uses an "add" button 65 and a "remove" button 66 to add or remove device types from the table 64. Available device types are listed in window 67. Developer 31 can see additional available device types not visible in FIG. 8 by scrolling down in window 67. On screen 63, developer 31 has selected five of the listed device types by adding those five device types to table 64. Developer 31 has selected "TV", "DVD", "VCR", "STB-HDTV", and "Receivers". Next, developer 31 adds an additional device type "TV-DVD Combo", which is not visible in FIG. 8. Developer 31 can then associate each of the selected device types with one of the three dedicated device-type keys. For example, developer 31 has chosen to control the DVD player using the VCR key on the remote control device. The set-top box for high definition television (STB-HDTV) is controlled using the TV key. Thus, the TV key is associated with codesets for both televisions and set-top boxes.

Figure 9:
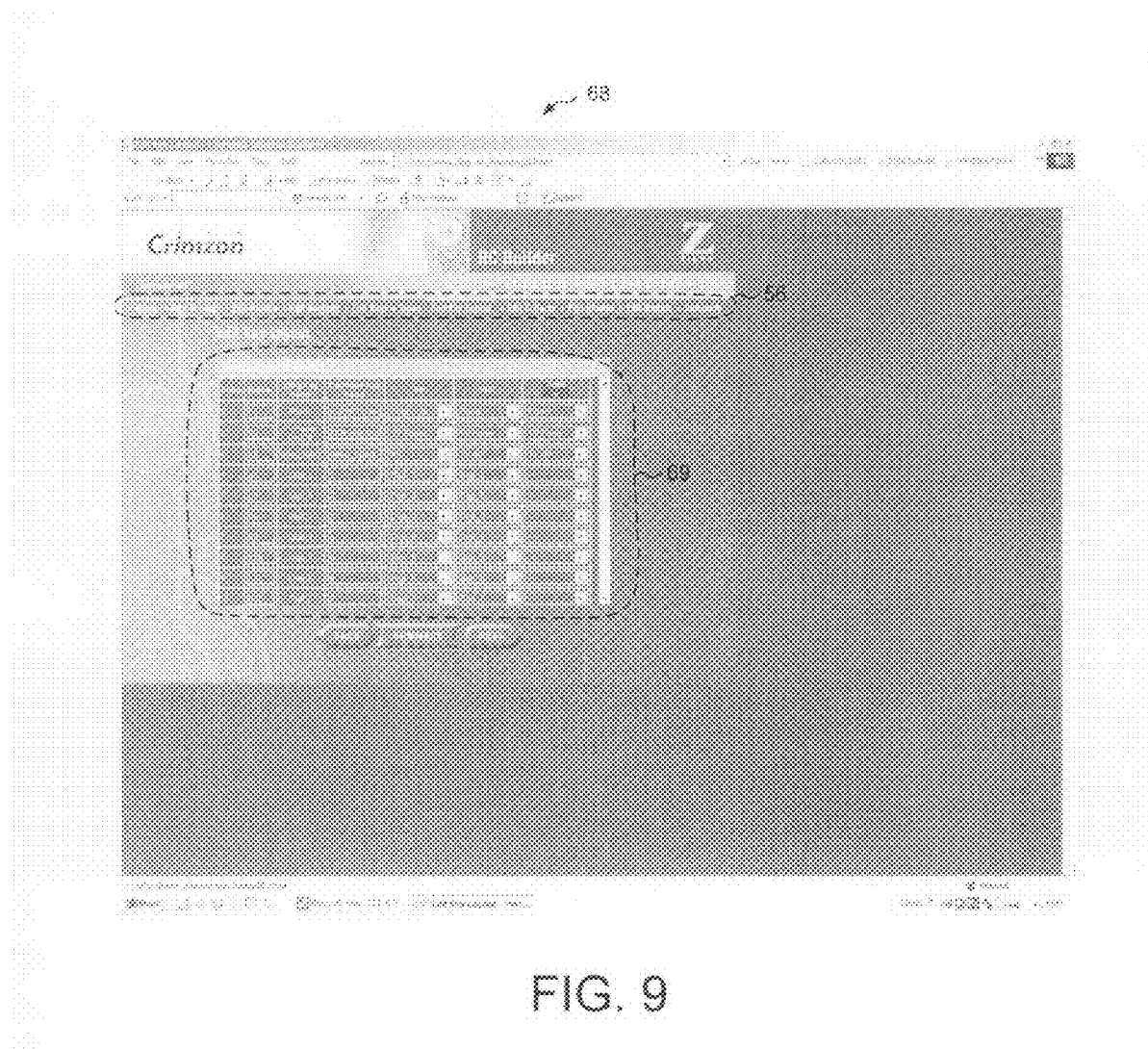
FIG. 9 is a screenshot of a web page that prompts the developer to assign functions to the keys of the new remote control device.

FIG. 9 shows a screen 68 that appears when developer 31 has completed table 64 and clicks on the "Next" button on screen 63. Screen 68 is the "edit key layout" screen. In a table 69, developer 31 assigns a name to each key of the new remote control device. Then developer 31 assigns a function to each key. There are three columns in table 69 in which to define functions because three dedicated device-type keys were entered in prior screens. For example, developer 31 assigns the name "VCR/VCD Power" to key number "K1". Developer 31 assigns the function "Diagnostic" to key "K1" when the remote control device is in the "TV" mode. The function of key "K1" is "Power" when the remote control device is the "VCR" mode or in the "DVD" mode. Consumer 19 can place the new remote control device in one of the three modes by pressing one of the three dedicated device-type keys before pressing the "K1" key.

Figure 10:
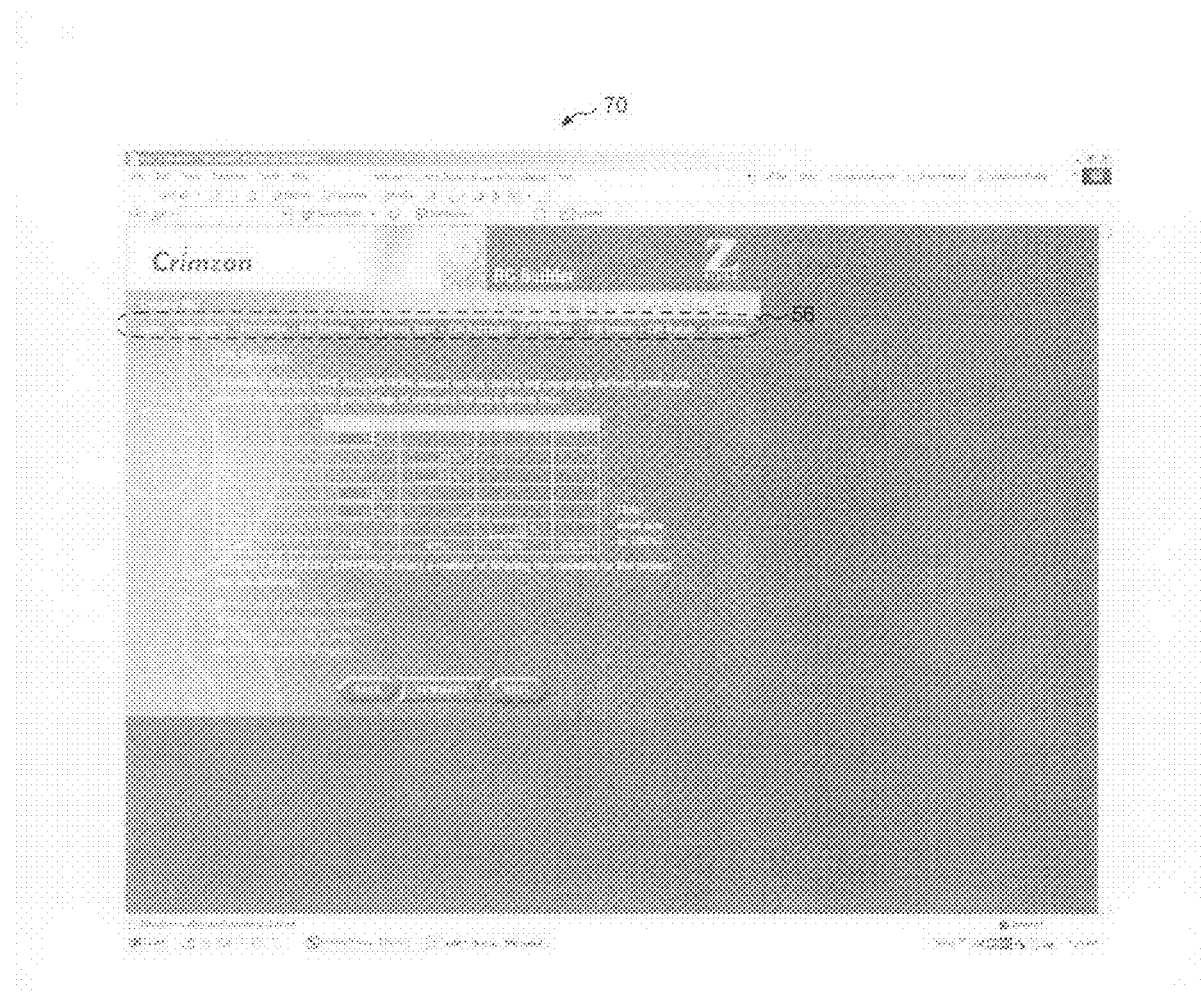
FIG. 10 is a screenshot of a web page that prompts the developer to allocate the amount of microcontroller memory to each device type controlled by the new remote control device.

FIG. 10 shows a screen 70 that appears when developer 31 clicks on the "next" button on screen 68 once developer 31 has assigned names and functions to all of the keys of the new remote control device. Navigation bar 56 indicates that screen 70 is the "edit criteria" screen. On screen 70, developer 31 allocates memory available in the microcontroller to codeset information related to each selected device type. In the illustrated example, memory for storing codeset information has been allocated to codesets for six selected device types. For example, five percent of the available memory on the microcontroller has been allocated to codeset information from codesets for HDTV set-top boxes. Screen 70 also shows the resulting memory associated with each of the three dedicated device-type keys. For example, forty-five percent of the available memory on the microcontroller has been allocated to codeset information related to the TV key. This codeset information is usable when the remote control is in the TV mode.

In addition, RC Builder application 30 allows developer 31 to fill the available memory with codeset information from: 1) the unique group of codesets that maximizes the number of device brands covered, 2) the unique group of codesets that maximizes the number of device models covered, 3) the unique group of codesets that covers the most popular device brands, or 4) the unique group of codesets that covers the most popular device models. Selection and development tool 10 selects codesets to perform the desired optimization using the codeset groupings of codeset selection criteria 32, as well as format and size information 39 in central database 12. By comparing the groups of codesets, RC Builder application 30 determines the overlap of codesets from among the groups of codesets that are categorized by device brand, device model, device brand popularity and device model popularity. Once developer 31 has made selections on screen 70, developer 31 clicks on the "Next" button.

RC Builder application 30 also allows developer 31 to load codeset information according to a predetermined priority of the selected codesets such that a predetermined amount of memory remains available on the microcontroller after the codesets are loaded. Developer 31 can then use the remaining free memory for customized remote control solutions, such as for strings of timing information that developer 31 himself customizes.

Figure 11:
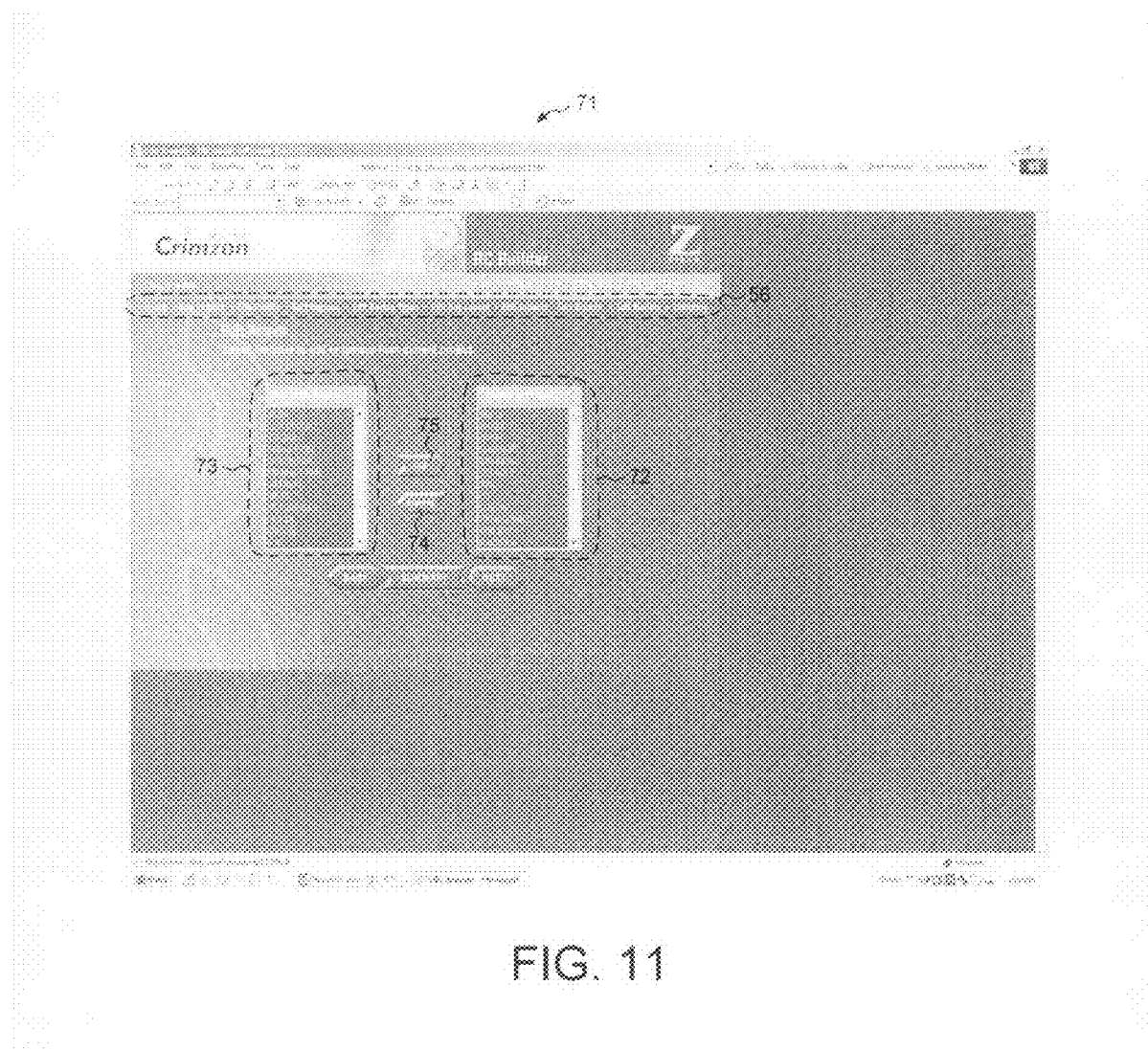
FIG. 11 is a screenshot of a web page that prompts the developer to select the device brands that the new remote control device is to control.

FIG. 11 shows a screen 71 that appears when developer 31 clicks on the "Next" button on screen 70. Screen 71 is the "edit brands" screen. Screen 71 displays the results of the optimization chosen by developer 31 in screen 70. RC Builder application 30 has selected the codesets for all electronic consumer devices corresponding to the brands shown in a "brands in project" window 72. The brands for which codesets were not selected appear in an "available brands" window 73 to the left. Developer 31 can then remove particular brands from "brands in project" window 72 by selecting a particular listed brand and then clicking on a "remove" button 74. Developer 31 can also add a brand to "brands in project" window 72 by selecting the desired brand in window 73 and then clicking on an "add" button 75. The selected brand will then appear in window 72 to the right. Once developer 31 has edited the brands in the project, developer 31 clicks on the "next" button.

Figure 12:
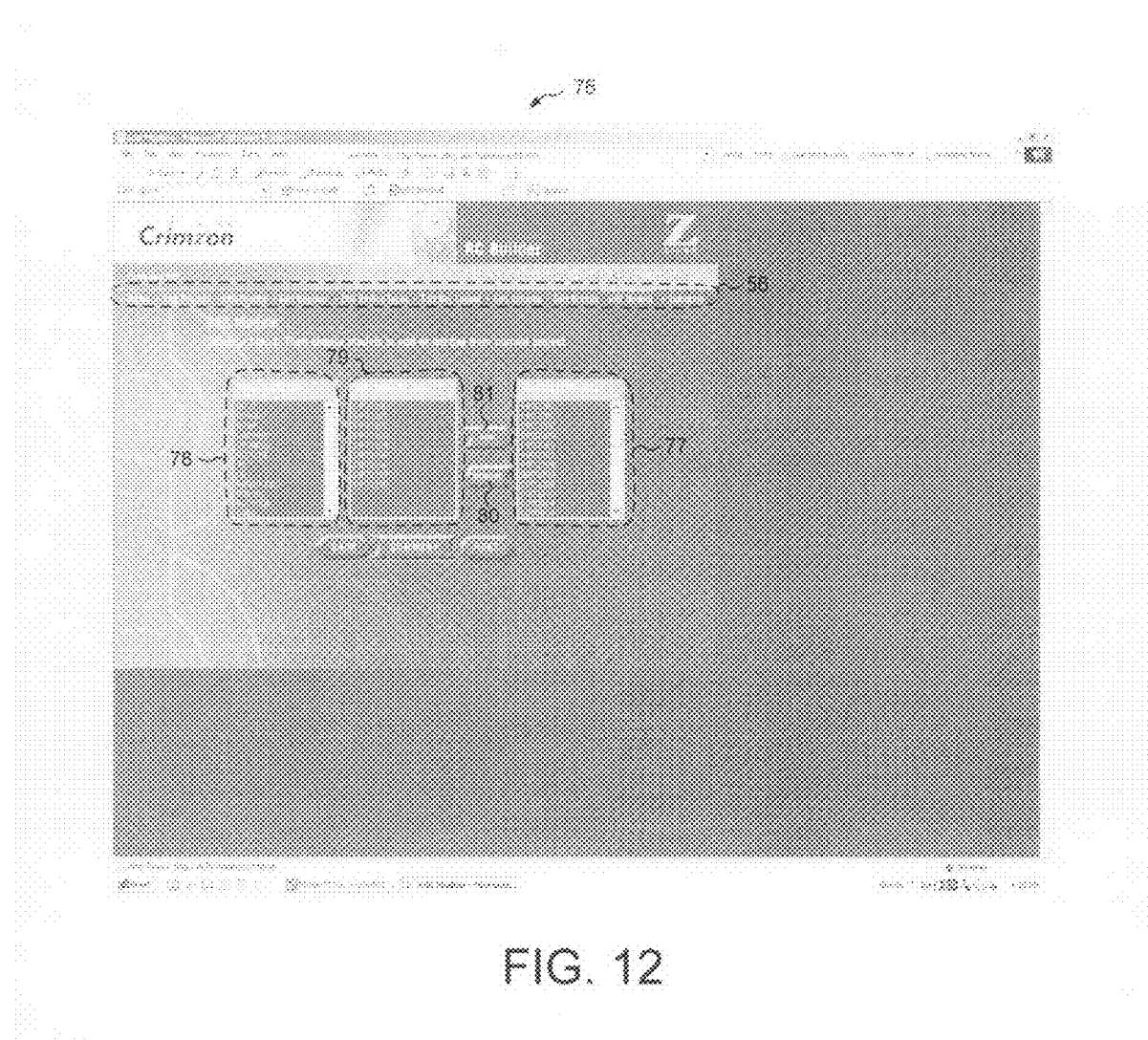
FIG. 12 is a screenshot of a web page that prompts the developer to select the device models that the new remote control device is to control.

FIG. 12 shows a screen 76 that developer 31 can use to edit device models in a manner similar to the editing of brands on screen 70. Currently selected models to be included in the project appear in a "models in project" window 77. Two windows appear to the left of window 77, one labeled "select a brand" 78 and the other labeled "available models" 79. Window 79 lists the available models for the brand selected in window 78. Developer 31 can remove a model from "models in project" window 77 by selecting the model and then clicking on a "remove" button 80. The selected model is then removed from window 77. Developer 31 can add a model to window 77 by selecting the brand of the model in window 78. When the brand is selected, various models for that brand appear in window 79. Developer 31 then selects a desired model from window 79 and clicks on an "add" button 81. The selected model then appears in window 77. Once developer 31 has edited the models in the project using screen 76, developer 31 clicks on the "next" button.

Figure 13:
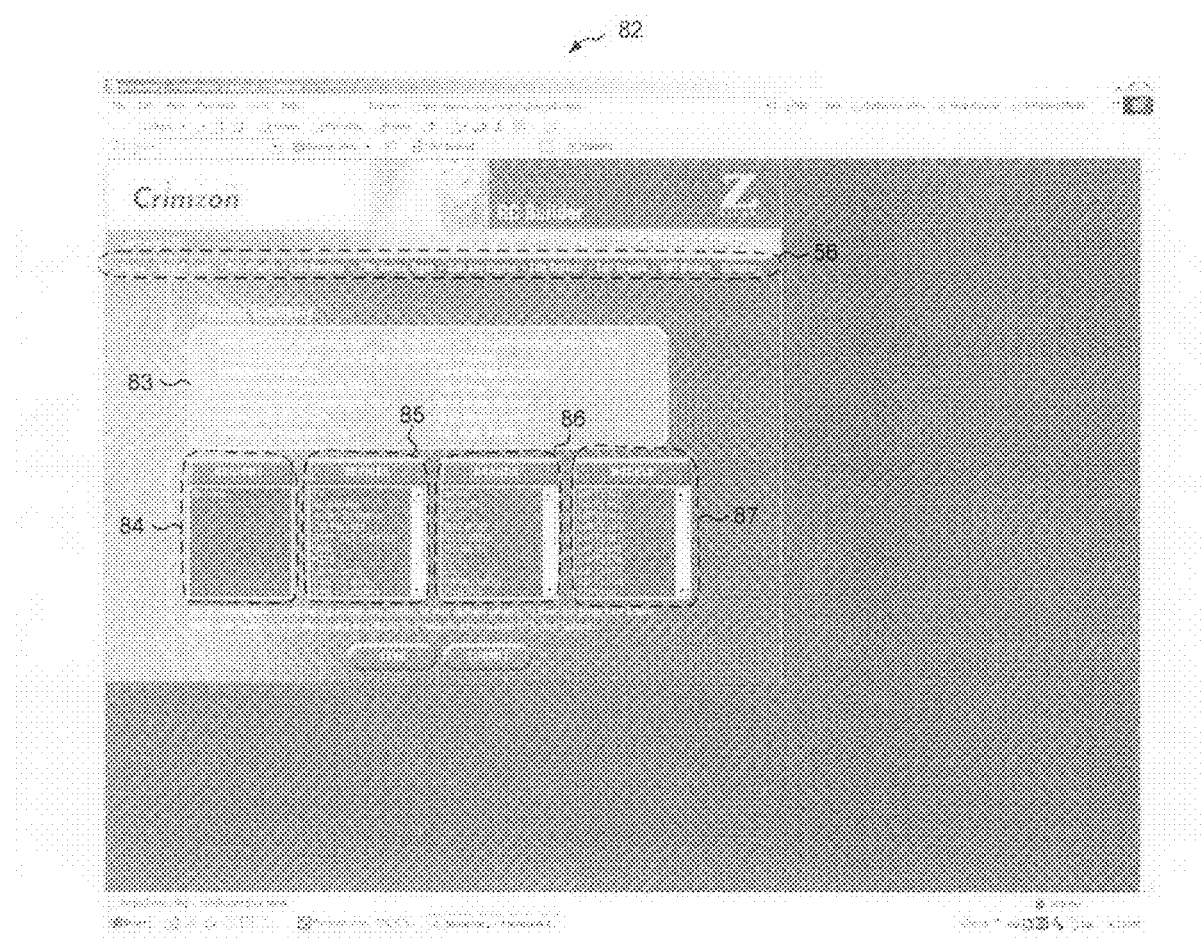
FIG. 13 is a screenshot of a web page that summarizes the codesets to be supported by the new remote control device.

FIG. 13 shows a screen 82 that is served up by web server 11 when developer 31 clicks on the "next" button on screen 76. Navigation bar 56 indicates that screen 82 is the "summary" screen. In an upper block 83, interactive, web-based codeset selection and development tool 10 displays information about the microcontroller code project, such as "project name", "date initiated", "platform", "total available memory", "total application code size" and "memory used". "Platform" indicates the particular type of microcontroller (a hardware platform) upon which the generated code is to operate. An example of a platform is a particular microcontroller manufactured by ZiLOG, Inc. and called "Crimzon". In this example, the total memory available on the microcontroller is thirty-two kilobytes, of which eight kilobytes are allocated by developer 31 to the microcontroller code. Developer 31 can return to prior screens using the tabs on navigation bar 56 and can add additional codesets to the project until all available memory is consumed.

Below block 83 in FIG. 13 are four windows, one labeled "regions" 84, one labeled "devices" 85, one labeled "brands" 86, and one labeled "models" 87. Region, device type, device brand and device model are indications of the selection criteria that RC Builder application 30 has presented to developer 31 for choosing codesets. Designations of the regions, device types, device brands and device models that developer 31 has selected appear in the four windows 84-87. For example, developer 31 has chosen not to include codeset information in the microcontroller code from codesets used outside Europe. Moreover, because "TV" is highlighted in window 85 and "Philips" is highlighted in window 86, window 87 lists all of the models of Philips televisions supported by the microcontroller code. Developer 31 can determine all of the device models supported by the microcontroller code by highlighting successive device brands in window 86 for each device type in window 85. Each time developer 31 selects a designation of an additional selection criterion, developer 31 selects a smaller subset of the overall group of codesets covered by all of the indicated selection criteria.

Step 40 of FIG. 3 is performed when each of screens 62, 63, 70 and 71 is transmitted from web server 11 to web client 13 and rendered by web browser 51 to developer 31. Screens 62, 63, 70 and 71 present developer 31 with indications of various selection criteria for choosing groups of codesets from central database of codesets 12 that the microcontroller code is to support. For example, step 40 is performed when web server 11 serves up a hypertext document in the form of screen 62 that includes an indication of a geographical region (a selection criterion) where a group of codesets is used.

Step 41 of FIG. 3 occurs when web server 11 receives a designation of the particular selection criteria developer 31 has chosen. Developer 31 causes the designation to be sent to web server 11 by clicking on the "submit" button on screen 82 (see FIG. 13) once developer 31 has defined the parameters of the microcontroller code.

In step 42 of FIG. 3, selection and development tool 10 selects a plurality of codesets from among the groups of codesets indicated in screens 62, 63, 70 and 71. Selection and development tool 10 selects the plurality of codesets using the designations of choices of selection criteria received from developer 31 in step 41. For example, RC Builder application 30 selects from among the group of codesets that are used in Europe only those codesets that also apply to device types designated in window 64 of screen 63 (FIG. 8), apply to device brands designated in window 72 of screen 71 (FIG. 11) and fit the memory limitations designated in screen 70 (FIG. 10). Finally, the plurality of codesets selected from among the groups of codesets presented to developer 31 can be further limited by adding or removing codesets for specific device models. In step 42, all of the codesets that are to be supported by the new remote control device are determined.

In step 43 of FIG. 3, selection and development tool 10 converts each of the selected codesets from the format of central database 12 into a plurality of strings of timing information. Each codeset is stored in central database 12 as codeset information 33 that is linked to a modulation, timing and framing protocol 34. Because there are more codesets than commonly used protocols, the total memory required to store multiple codesets is reduced by not including modulation, timing and framing information with each codeset, but rather by sharing the smaller number of protocols among the multiple codesets.

FIG. 2 illustrates step 43 of FIG. 3 in which string extractor middleware 17 converts codeset information 33 for a particular codeset and its associated protocol #004 from modulation, timing and framing protocols 34 into a plurality of strings of timing information. Two of the plurality of strings are shown: a first string of timing information 88 and a second string of timing information 89. One string of timing information is generated for each function of the particular electronic consumer device (or devices) that the codeset is to control. Most functions are controlled by a key on the new remote control device, although some functions are controlled by more than one key. Each string of timing information is a binary file.

In one embodiment, the first several bytes of first string 88 make up a function or key identifier 90 for the function or key controlled by key data 91 that follows. Key data 91 is a string of numbers alternately representing mark times and space times. For example, each number in the string is represented by four bits. After the key identifier, the number beginning the key data is defined to represent a mark time. The next number represents a space time, and the mark times and space times alternate thereafter.

In addition to strings of timing information, string extractor middleware 17 generates a list of mark times 92 and a list of space times 93. The numbers in key data 91 correspond to the row numbers of the list of mark times 92 and of the list of space times 93. For example, key data 91 begins with a mark time of 3940 microseconds, followed by a space time of 950 microseconds, a mark time of 450 microseconds and a space time of 2000 microseconds. Each mark time value of mark times 92 and each space time value of space times 93 is a sixteen bit value.

In step 44 of FIG. 3, RC builder application 30 encrypts the plurality of strings of timing information derived from codeset information 33. For the encryption, RC builder application 30 uses an encryption key 94 stored on web server 11. RC builder application 30 also encrypts the list of mark times 92 and the list of space times 93.

In step 45 of FIG. 3, selection and development tool 10 then transmits the encrypted plurality of strings of timing information as a binary file to web client 13, where the encrypted strings are stored on hard drive 95. For example, first string of timing information 88 is encrypted in step 44 and transmitted in step 45 in the form of first encrypted string of timing information 96 from web server 11 via Internet 26 and over unsecure telephone cable 50 to web client 13. For additional details on transmitting encrypted codeset information over an unsecure channel from a server and central database of codesets to various mechanisms that decrypt the codeset information and generate operational signals, see U.S. patent application Ser. No. 10/722,711 entitled "Encrypting Codeset Data Used By Remote Control Devices To Operate Consumer Appliances," filed on Nov. 24, 2003, which is incorporated herein by reference.

In step 46 of FIG. 3, selection and development tool 10 transmits a signal engine 97 and a compiler 98 to web client 13. Signal engine 97 and compiler 98 are transmitted without being encrypted.

Signal engine 97 is provided to developer 31 in source code so that developer 31 can examine the source code and customize the manner in which strings of timing information are used to generate operational signals. Developer 31 can edit signal engine 97 using client software 99 that developer 31 can download from web server 11. Alternatively, the microcontroller manufacturer can make client software 99 generally available on compact disc to developers of microcontroller code. Client software 99 is a text editor similar to WordPad by Microsoft Corporation.

Compiler 98 is provided to developer 31 as executable code. After signal engine 97 has been edited as desired, compiler 98 is used to compile signal engine 97.

Along with client software 99, developer 31 is provided with customizable strings of timing information 100. Unlike first encrypted string of timing information 96 (transmitted to web client 13 in step 45), the customizable strings 100 are provided to developer 31 in an unencrypted form. Whereas it is difficult for developer 31 to decipher the contents of the first encrypted string of timing information 96, developer 31 can view and edit and copy the customizable strings 100 to make custom strings of timing information. The developer may use this capability to add strings of timing information to support electronic consumer devices for which there is no codeset in the database of codesets 12.

In step 47 of FIG. 3, developer 31 loads the compiled signal engine 97 onto a microcontroller 101. Microcontroller development board 14 is coupled to web client 13, for example, by a universal serial bus (USB) 102. Developer 31 places a new microcontroller into microcontroller development board 14 and then transfers the compiled signal engine 103, first encrypted string of timing information 96, and any custom strings of timing information to microcontroller 101. Compiled signal engine 103 is stored in flash memory of microcontroller 101.

The microcontroller manufacturer provides developer 31 with the new microcontroller to place in microcontroller development board 14. The microcontroller manufacturer preloads its microcontrollers with various decryption keys that correspond the encryption keys used to encrypt strings of timing information. For example, the microcontroller manufacturer provides developer 31 with microcontroller 101 that has a preloaded decryption key 104 corresponding to encryption key 94.

In step 48 of FIG. 3, compiled signal engine 103 accesses decryption key 104 in microcontroller 101 and decrypts first encrypted string of timing information 96 to retrieve first string of timing information 88. First string of timing information 88 is then stored in flash memory of microcontroller 101. Microcontroller 101 is also loaded with a key scanning program that detects which key or keys have been pressed and thereby identifies the function that is to be performed.

In step 49 of FIG. 3, compiled signal engine 103 uses first string of timing information 88 to generate an operational signal. The operational signal is transmitted from the remote control device by an IR carrier signal to an electronic consumer device such that the operational signal controls the corresponding function of the electronic consumer device.

Compiled signal engine 103 executes within microcontroller 101 upon separate strings of timing information to generate operational signals for separate functions. For example, an operational signal for the function "power on" is generated from first string of timing information 88, whereas a second operational signal for the function "play DVD" is generated using the second string of timing information 89. In the same way that compiled signal engine 103 uses first string of timing information 88 to generate operational signals, so too can compiled signal engine 103 use the custom string of timing information to generate a custom operational signal. The operational signals are transmitted from an infrared light emitting diode (LED) on microcontroller development board 14. In operation, when microcontrollers are loaded into remote control devices, the operational signals are transmitted from LEDs on the remote control devices.

Once microcontroller 101 is programmed, developer 31 can then test the programmed microcontroller in its intended environment in a remote control device and use the microcontroller to control electronic consumer devices. Once the microcontroller code is optimized and debugged, compiled signal engine 103 and encrypted strings of timing information, such as first encrypted string of timing information 96, can be programmed into factory-masked ROM microcontrollers.

In another aspect of the invention, selection and development tool 10 minimizes or reduces the size of compiled signal engine 103. In one example, selection and development tool 10 examines the codesets developer 31 has selected and determines the corresponding capabilities and functionality required by compiled signal engine 103. Several versions of the signal engine are available. Some may occupy more memory space but have more functionality, whereas others occupy less memory space by have less functionality. To reduce the amount of memory space occupied by the compiled signal engine 103 on microcontroller 101, selection and development tool 10 chooses the appropriate one of the several versions of signal engine 97 that has all the functionality required and that also occupies the least amount of memory space when loaded onto microcontroller 101.

In another example, signal engine 97 is implemented in modules. If the functionality of a module is not required, then the module is not used in the source code of signal engine 97. When the selection of modules to be included in signal engine 97 is finalized by selection and development tool 10, the necessary modules and the other "glue" portion of signal engine 97 are sent to web client 13. Accordingly, a small signal engine 97 is created that has the needed functionality, but that does not have unnecessary capability not required to implement the selected codesets.

In yet another aspect of the invention, for each selected codeset string extractor middleware 17 generates a script containing embedded codeset information 33 and information from the linked modulation, timing and framing protocol. For example, a script for one codeset includes system code 38, information from modulation, timing and framing protocol #004 and key data 37 for each function of the codeset. The script is encrypted in web server 11 using encryption key 94 and is sent to web client 13 and to microcontroller development board 14. The encrypted script is then loaded on microcontroller 101 using the development board 14. As the script is received onto microcontroller 101, it is decrypted using decryption key 104 and is loaded into memory of microcontroller 101 in unencrypted form. In addition to the script, a script interpreter program, the key scanning program, and signal engine 103 are loaded on microcontroller 101. The script interpreter program can be provided by the microcontroller manufacturer along with the microcontroller development board 14.

Microcontroller 101 is now programmed, and developer 31 can test the programmed microcontroller in a remote control device. When a key is pressed on the remote control device, the pressing of the key is detected by the key scanning program and a number indicative of which key was pressed is supplied to the script. For example, when the "power on" key is pressed, the script is interpreted by the script interpreter program such that list of mark times 92, list of space times 93, and first string of timing information 88 is generated. Compiled signal engine 103 then accesses list of mark times 92, list of space times 93 and first string of timing information 88 and outputs a corresponding operational signal.

Although the present invention has been described in connection with certain specific embodiments for instructional purposes, the present invention is not limited thereto. In the embodiments above, codesets are stored in central database of codesets 12. In other embodiments, codesets are not stored in one physical location, but rather are stored in a distributed database. Developer 31 accesses web server 11 via the Internet 26. Selection and development tool 10, however, can also be configured to provide access to web server 11 over an intranet, for example, in an intra-company environment.

Although embodiments have been described above in which lists of mark times and space times are generated in web server 11 or are generated by scripts, lists of the most commonly used mark and space times can be preloaded in microcontroller 101. The strings of timing information do not contain lists of mark and space times, but rather point compiled signal engine 103 to the appropriate indices of the preloaded lists such that compiled signal engine 103 can generate operational signals. Selection and development tool 10 is used to program a microcontroller that has a factory programmed decryption key that cannot be read back out of the microcontroller. In other embodiments, selection and development tool 10 transmits the decryption key from web server 11 to microcontroller development board 14 and loads the microcontroller with the decryption key.

Although embodiments have been described above wherein selection and development tool 10 generates strings of timing information using codeset information 33 stored in central database 12, information used to generate strings of timing information can also be captured by microcontroller development board 14 by "learning" the operational signals transmitted by an uncategorized remote control device as each key of the remote control is pressed. Microcontroller development board 14 contains an IR receiver that receives the operational signals from the uncategorized remote control device. Client software 99 can contain a stand-alone analyzer to analyze the strings of marks and spaces contained in the operational signals and to convert the strings of marks and spaces into strings of timing information. Alternatively, the strings of marks and spaces are transmitted to the RC Builder application 30, where they are analyzed and converted into strings of timing information. The strings of timing information are then transmitted back to web client 13. In addition, the strings of marks and spaces that are transmitted to the RC Builder application 30 are converted into the format of codeset information 33 and modulation, timing and framing protocols 34. Thus, central database 12 is updated with codesets of uncategorized remote control devices that are captured by microcontroller development board 14.

In some embodiments, the selection and development tool transmits only encrypted codeset information, whereas in other embodiments the selection and development tool transmits unencrypted codeset information. The selection and development tool, however, can limit and control the number of codesets provided in this way to each developer and monitors which developers have been provided with which codesets. A signature may be embedded into the codeset information supplied and the signature may be linked to the developer to whom the codeset information is supplied such that simple copying of the codeset information will result in copying of the signature as well. The signature may then be used to confirm unauthorized future use of the codeset information. Accordingly, various modifications, adaptations, and combinations of various features of the described embodiments can be practiced without departing from the scope of the invention as set forth in the claims.

What is claimed is:

1. A method comprising:
transmitting from a web server a hypertext document, the hypertext document including an indication of a selection criterion of a group of codesets, wherein each codeset of the group of codesets controls an electronic consumer device;
receiving onto the web server from a web client a designation of the selection criterion;
selecting from a database associated with the web server the group of codesets using the designation of the selection criterion, wherein the selected group of codesets controls a group of electronic consumer devices that correspond to the selection criterion; and transmitting to the web client from the web server the selected group of codesets with at least one codeset of the selected group of codesets being converted into a plurality of strings of timing information; a signal engine which is editable via use of client software to customize a manner in which timing information is used to generate operational signals, and a compiler for compiling the signal engine whereupon the compiled signal engine is usable by a microcontroller with the selected group of codesets to cause generation of operational signals to control functions of the group of electronic consumer devices that correspond to the selection criterion.

2. The method of claim 1, wherein the electronic consumer devices that correspond to the selection criterion are taken from the group consisting of: the largest number of types of electronic consumer devices, the largest number of brands of electronic consumer devices, the largest number of models of electronic consumer devices, and the electronic consumer devices that are used in the most geographical regions.

3. The method of claim 1, wherein the selected group of codesets both fits within a memory of a remote control device and controls a group of electronic consumer devices that correspond to the selection criterion the group of codesets.

4. The method of claim 1, further comprising:
encrypting the plurality of strings of timing information; and
transmitting the encrypted plurality of strings of timing information to the web client.

5. The method of claim 1, further comprising:
transmitting editable codesets having customizable strings of timing information to the web client.

6. The method of claim 1, wherein the signal engine is implemented in selectable modules.

\* \* \* \* \*